US008782987B2

(12) United States Patent
Kabatsi et al.

(10) Patent No.: US 8,782,987 B2

(45) Date of Patent: Jul. 22, 2014

(54) SUPPORTED ARCHITECTURAL STRUCTURE

(71) Applicants: Chris Kabatsi, Gardena, CA (US); Robert Kilian, Gardena, CA (US)

(72) Inventors: Chris Kabatsi, Gardena, CA (US); Robert Kilian, Gardena, CA (US)

(73) Assignee: Arktura LLC, Gardena, CA (US)

( * ) Notice: Subject to any disclaimer, the term of this patent is extended or adjusted under 35 U.S.C. 154(b) by 0 days.

(21) Appl. No.: 13/949,702

(22) Filed: Jul. 24, 2013

(65) Prior Publication Data

US 2013/0306810 A1 Nov. 21, 2013

Related U.S. Application Data

(62) Division of application No. 13/159,344, filed on Jun. 13, 2011.

(51) Int. Cl.

| | |
|---|---|
| ***E04B 1/38*** | (2006.01) |
| ***E04C 1/40*** | (2006.01) |
| ***F16M 13/02*** | (2006.01) |
| ***E04B 2/00*** | (2006.01) |

(52) U.S. Cl.

CPC . *F16M 13/02* (2013.01); *E04B 2/00* (2013.01)
USPC ....... 52/507; 52/506.01; 52/506.07; 160/131; 160/166.1; 248/317; 248/339; 248/343

(58) Field of Classification Search

USPC ............ 52/506.01, 506.07, 507, 668, 506.08, 52/222, 777, 645, 669; 160/131, 166.1; 248/317, 339, 343

See application file for complete search history.

(56) References Cited

U.S. PATENT DOCUMENTS

| | | | | |
|---|---|---|---|---|
| 2,155,694 | A * | 4/1939 | Tench | 52/669 |
| 2,639,011 | A * | 5/1953 | Peterson | 52/668 |
| 3,044,586 | A * | 7/1962 | Wellman | 52/668 |
| 3,321,882 | A * | 5/1967 | Stahlhut | 52/506.06 |
| 3,466,830 | A * | 9/1969 | Smith | 52/777 |
| 3,755,988 | A * | 9/1973 | Van Der Sluys | 52/473 |
| 3,911,638 | A * | 10/1975 | Englund et al. | 52/506.08 |
| 3,969,870 | A * | 7/1976 | Deaton | 52/645 |
| 4,114,673 | A * | 9/1978 | de Wit et al. | 160/168.1 R |
| 4,133,160 | A * | 1/1979 | Segil | 52/645 |
| 4,137,678 | A * | 2/1979 | Varlonga | 52/39 |
| 4,364,215 | A * | 12/1982 | Gailey et al. | 52/506.08 |
| 4,426,822 | A * | 1/1984 | Gailey | 52/669 |
| 4,471,596 | A * | 9/1984 | Deaton et al. | 52/668 |
| 4,545,165 | A * | 10/1985 | Carey et al. | 52/506.07 |
| 4,706,433 | A * | 11/1987 | Rijnders | 52/473 |
| 4,852,325 | A * | 8/1989 | Dunn et al. | 52/506.07 |
| 5,241,799 | A * | 9/1993 | Jahn | 52/506.06 |
| 5,335,156 | A * | 8/1994 | Caferro | 362/291 |
| 5,413,300 | A * | 5/1995 | Hosteing | 248/317 |
| 6,192,642 | B1 * | 2/2001 | Colson et al. | 52/506.06 |
| 6,199,337 | B1 * | 3/2001 | Colson et al. | 52/506.06 |

(Continued)

*Primary Examiner* — Nkeisha Smith

(74) *Attorney, Agent, or Firm* — Cotman IP Law Group, PLC

(57) ABSTRACT

A supported architectural structure is presented. A plurality of primary supports configured to couple with one or more architectural structures. A plurality of flexible fins, where at least one of the plurality of flexible fins includes an inner edge and an outer edge, where the inner edge includes a plurality of attachment points. A plurality of secondary supports configured to couple with the plurality of primary supports, where at least one of the secondary supports includes a plurality of fin slots configured to couple with the plurality of attachment points.

13 Claims, 8 Drawing Sheets

200 216 218 220 222 204 214 224 206 208 210 212

(56) References Cited

U.S. PATENT DOCUMENTS 6,318,042 B1 * 11/2001 Bloom et al. .............. 52/506.07
6,427,409 B2 * 8/2002 Colson et al. .............. 52/506.08
6,834,467 B2 * 12/2004 Gulbrandsen et al. ..... 52/506.07
7,198,388 B2 * 4/2007 Pilby ............................. 362/325
7,406,802 B2 * 8/2008 Stackenwalt et al. ........... 52/222
7,578,107 B2 * 8/2009 Platt ........................... 52/506.06
8,096,089 B2 * 1/2012 Platt ................................ 52/316
2005/0011150 A1 * 1/2005 Stackenwalt et al. ........ 52/311.1
2008/0307724 A1 * 12/2008 Krantz-Lilienthal et al. .. 52/222

* cited by examiner

SUPPORTED ARCHITECTURAL STRUCTURE

CROSS-REFERENCE TO RELATED APPLICATIONS

The present application is a Divisional of U.S. patent application Ser. No. 13/159,344, filed on Jun. 13, 2011, specification of which is herein incorporated by reference for completeness of disclosure.

BACKGROUND OF THE INVENTION

Field of the Invention

Embodiments of the invention described herein pertain to the field of static structures. More particularly, but not by way of limitation, one or more embodiments of the invention discloses an architectural structure supported from a ceiling or similar structure.

BRIEF SUMMARY OF THE INVENTION

One or more embodiments of systems and methods for a supported architectural design are directed to a supported architectural design system including a plurality of primary supports configured to couple with one or more architectural structures. In one or more embodiments of the supported architectural design system, the one or more architectural structures include a ceiling system. In one or more embodiments of the supported architectural design system, the one or more architectural structures include at least one wall.

In one or more embodiments of the supported architectural design system, the plurality of primary supports is coplanar. The plurality of primary supports may be substantially parallel when coupled with the one or more architectural structures and the plurality of secondary supports.

The supported architectural design system further includes a plurality of flexible fins. At least one flexible fin of the plurality of flexible fins may include an inner edge and an outer edge. The inner edge may include a plurality of attachment points. In one or more embodiments of the supported architectural design system, the plurality of flexible fins is made from veneered steel.

In one or more embodiments of the supported architectural design system, the plurality of attachment points includes a plurality of holes configured to receive one or more fasteners. The one or more fasteners may secure the plurality of flexible fins to the plurality of secondary supports in the plurality of fin slots.

In one or more embodiments of the supported architectural design system, the plurality of attachment points includes a plurality of tabs including one or more holes. The plurality of fin slots may be configured to receive the plurality of tabs. The plurality of secondary supports may further include attached fasteners configured to couple with the one or more holes to secure the plurality of flexible fins to the plurality of secondary supports by the plurality of tabs.

The supported architectural design system further includes a plurality of secondary supports configured to couple with the plurality of primary supports. At least one of the secondary supports includes a plurality of fin slots configured to couple with the plurality of attachment points. In one or more embodiments of the supported architectural design system, the plurality of secondary supports is coplanar. The plurality of secondary supports may be substantially parallel when coupled with the plurality of primary supports. In one or more embodiments of the supported architectural design system, the plurality of secondary supports is substantially perpendicular to the plurality of primary supports when coupled with the plurality of primary supports. At least one secondary support of the plurality of secondary supports may be curved.

In one or more embodiments of the supported architectural design system, the plurality of primary supports include one or more strut channels compatible with one or more standardized structural systems. One or more embodiments of the supported architectural design system further include one or more additional structural components compatible with the one or more standardized structural systems, where the one or more additional structural components are configured to couple with the one or more strut channels.

The one or more additional structural components may include one or more lighting systems. The one or more additional structural components may include one or more security systems. In one or more embodiments of the supported architectural design system, the one or more additional structural components include at least one hanging element extending past the outer edge of the plurality of flexible fins.

In one or more embodiments of the supported architectural design system, the plurality of fin slots include angled cuts made in the plurality of secondary supports. A plurality of positions and shapes of the angled cuts may be determined by processing a fin configuration design on a general purpose computer including at least one processor configured to execute computer-readable instructions stored on a computer-readable medium. The computer-readable instructions are configured to cause the at least one processor to calculate the plurality of positions and shapes of the angled cuts based on the fin configuration design.

In one or more embodiments of the supported architectural design system, at least one of t secondary supports is a channel, and at least one of said fin slots is a cut through a bottom wall of the channel and a partial cut through two side walls of the channel.

In one or more embodiments of the supported architectural design system, at least one of the secondary supports is a curved channel, at least one of said fin slots comprises a cut through a bottom wall of the channel, and the plurality of attachment points includes at least one protruding tab configured to fit in the fin slot.

One or more embodiments of the supported architectural design system further include a plurality of fasteners coupled with the plurality of secondary supports, where the plurality of fasteners automatically engages at least a portion of the plurality of attachment points to couple the plurality of flexible fins with the plurality of secondary supports.

In one or more embodiments of the supported architectural design system, an outer surface including a plurality of the outer edges of the plurality of flexible fins conforms to a curved two-dimensional surface.

One or more embodiments of systems and methods for a supported architectural design are directed to a supported architectural design system including at least two primary supports. The at least two primary supports may be coplanar and substantially parallel.

The supported architectural design system further includes at least four channel nut connectors configured to couple with the at least two primary supports to secure the at least two primary supports to one or more ceiling structures.

The supported architectural design system further includes a plurality of flexible fins. At least one of the plurality of flexible fins may have an inner edge and an outer edge, where the inner edge includes a plurality of attachment points.

The supported architectural design system further includes at least four secondary supports configured to couple with the plurality of primary supports at a right angle, where the at least four secondary supports are coplanar and substantially parallel The at least four secondary supports include a plurality of fin slots configured to couple with the plurality of attachment points.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for a supported architectural design will now be described. In the following exemplary description numerous specific details are set forth in order to provide a more thorough understanding of embodiments of the invention. It will be apparent, however, to one of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the systems and methods for a supported architectural design.

Figure 1:
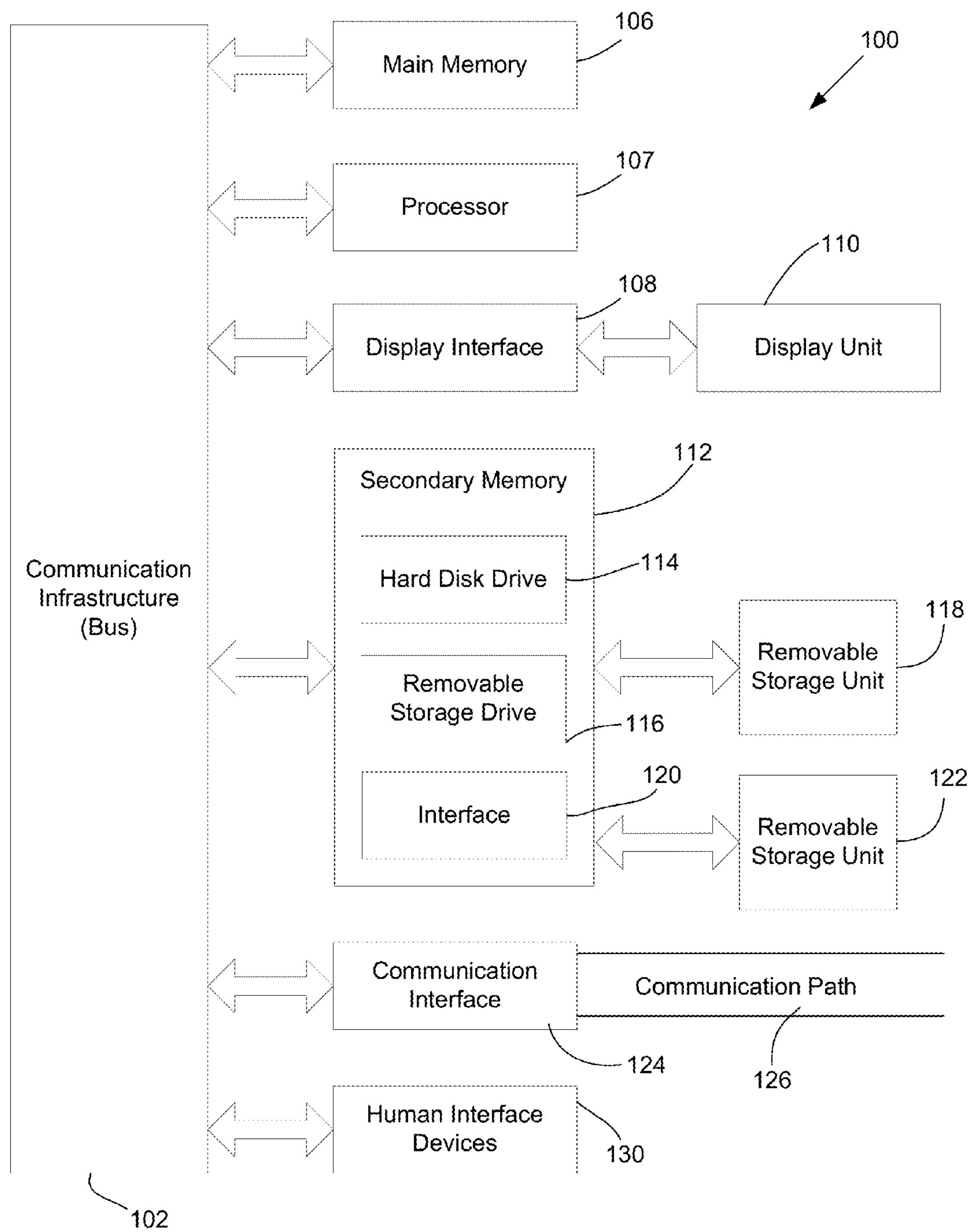
FIG. 1 illustrates a general-purpose computer and peripherals that when programmed as described herein may operate as a specially programmed computer capable of implementing one or more methods, apparatus and/or systems of the solution.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

Figure 2:
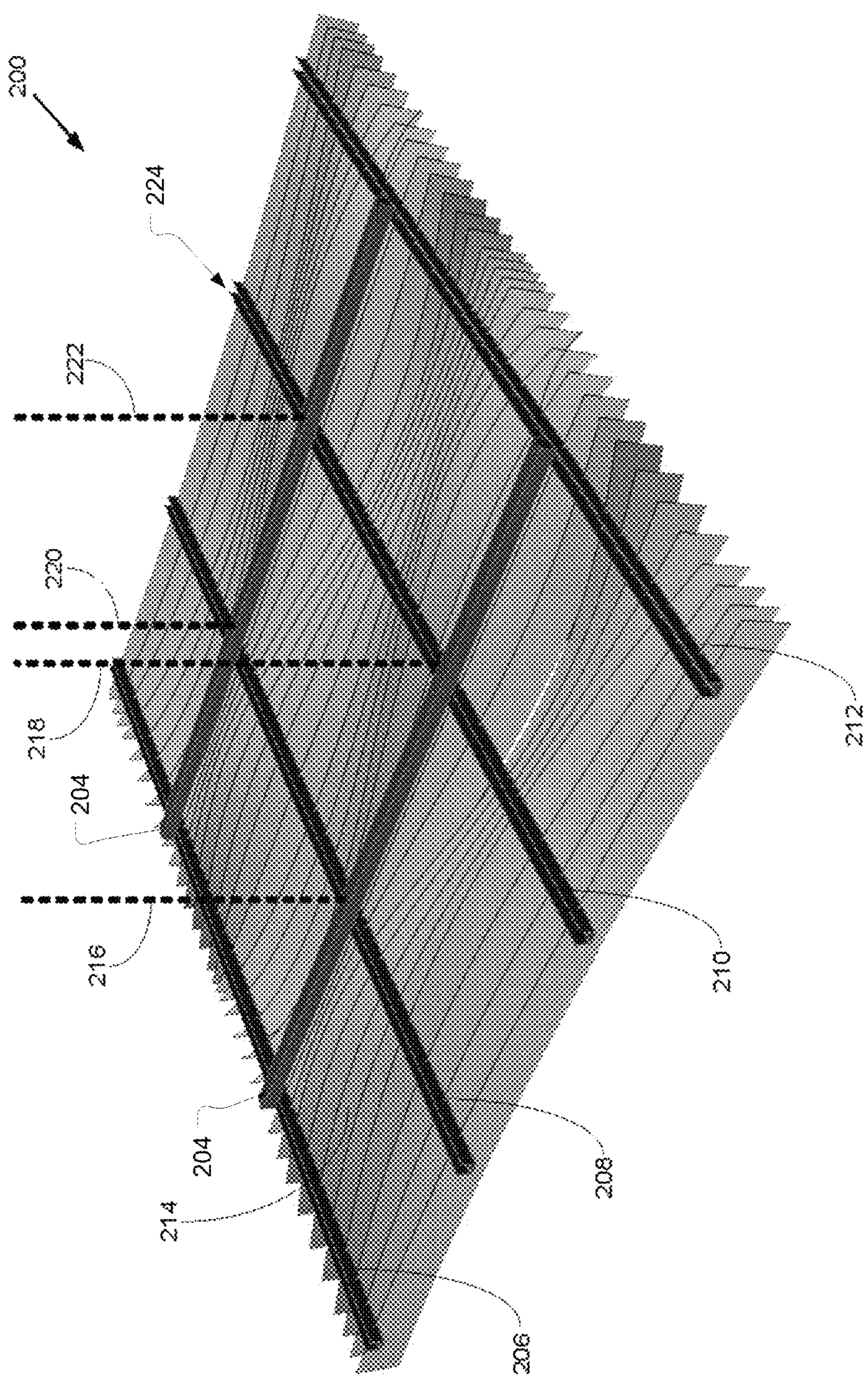
FIG. 2 is a top perspective view of an exemplary supported architectural design system in accordance with one or more embodiments of systems and methods for a supported architectural design.

FIG. 2 is a top perspective view of an exemplary supported architectural design system in accordance with one or more embodiments of systems and methods for a supported architectural design. Supported architectural design system 200 includes a plurality of primary supports 202-204. In one or more embodiments, primary supports 202-204 are coplanar. In one or more embodiments, primary supports 202-204 are substantially parallel. Primary supports 202-204 may be constructed of any suitable material, such as plastic, wood, metal, composite, or any other material suitable for providing structural support.

Although two primary supports 202-204 are shown, one of ordinary skill in the art will recognize that any number of primary supports may be used without departing from the spirit or the scope of the embodiments described herein.

Primary supports 202-204 are configured to couple with one or more architectural structures. Primary supports 202-204 may couple with one or more architectural structures by one or more fasteners and/or structural components capable of supporting supported architectural design system 200, including but not limited to one or more cables, struts, beams, couplers, plates, joints, pipes, rails, or any other structural components capable of partially or fully supporting supported architectural design system 200. The one or more fasteners may include nuts, bolts, screws, clamps, pins, clips, sheet metal, hinges, rivets, lugs, caps, washers, nails, anchor, or any other fastener capable of coupling primary supports 202-204, one or more structural components, and one or more architectural structures. Primary supports 202-204 may be configured to couple with at least one wall system and/or structure. In one or more embodiments, primary supports 202-204 are configured to couple with one or more ceiling systems and/or structures.

Figure 8:
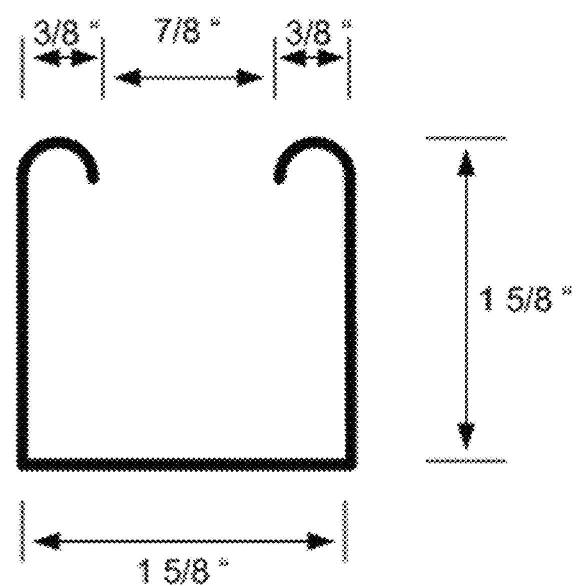
FIG. 8 is a cross sectional view of a primary or secondary support structure showing a standard strut channel.

In one or more embodiments, primary supports 202-204 include one or more strut channels 224 compatible with one or more standardized structural systems. A standard strut channel is illustrated in FIG. 8. As used herein, the term "standardized structural system" refers to any standardized structural system used in construction. In one or more embodiments, the strut channel is constructed out of a metal, such as aluminum, steel or any other metal suitable for use in construction for structural support. In one or more embodiments, the strut channel is formed from sheet metal folded over into an open channel shape with and inwards-folding lips that enhance structural support and provide a mounting surface for interconnecting components compatible with the standardized structural system. In one or more embodiments, the strut channel has a width and a height of 1⅝ inches. One or more embodiments of supported architectural design system 200 may further include one or more additional structural components compatible with the standardized structural system, as described more fully at FIG. 3.

In one or more embodiments, primary supports 202-204 include one or more P1000 Unistruts coupled to one or more hanger rods and/or cables using one or more Unistrut "U" shape fittings and one or more fasteners, such as one or more bolts and channel nuts. The one or more hanger rods and/or cables are configured to couple with one or more ceiling systems to suspend supported architectural design system 200. The one or more hanger rods and/or cables may be positioned along axes 216-222. In one or more embodiments, one or more Unistrut support components are configured to pass through the one or more Unistrut "U" shape fittings. Additional structural components compatible with the standardized structural system may be attached to the one or more Unistrut support components. A Unistrut "U" shape fitting may be provided for each quadrant of supported architectural design system 200.

Supported architectural design system 200 further includes a plurality of secondary supports 206-212. In one or more embodiments, secondary supports 206-212 are coplanar. In one or more embodiments, secondary supports 206-212 are substantially parallel.

Although secondary supports shown in FIG. 2 are straight, at least one of secondary supports 206-212 may be curved without departing from the spirit or the scope of the embodiments described herein. In one or more embodiments, at least one of outer secondary supports 206 and 212 is curved. As used herein, the term "curved" is used to describe a shape other than a straight line, including any shape that has a combination of straight, angular and arched segments. In one or more embodiments, when outer secondary supports 206 and 212 are curved, attachment points of flexible fins 214 are coupled to fin slots of outer secondary supports 206 and 212 in accordance with FIG. 6.

Secondary supports 206-212 may be constructed of any suitable material, such as plastic, wood, metal, composite, or any other material suitable for providing structural support. In one or more embodiments, secondary supports 206-212 are constructed out of a metal, such as steel, aluminum, or any other metal suitable for secondary supports 206-212.

Secondary supports 206-212 are configured to couple with primary supports 202-204. In one or more embodiments, secondary supports 206-212 are substantially perpendicular to primary supports 202-204 when coupled. Secondary supports 206-212 may be coupled with primary supports 202-204 with one or more fasteners, including but not limited to one or more may include nuts, bolts, screws, clamps, pins, clips, sheet metal, hinges, rivets, lugs, caps, washers, nails, anchor, or any other fastener capable of partially or fully coupling secondary supports 206-212 to primary supports 202-204. In one or more embodiments, secondary supports 206-212 are welded, manufactured, molded, glued, taped, or otherwise attached to primary supports 202-204 with or without one or more fasteners.

In one or more embodiments, secondary supports 206-212 are cold rolled steel channels. Although any gauge of metal may be used to form channels of any size, one or more embodiments of secondary supports 206-212 are 12 gauge cold rolled steel channels with a length and width of 1.5 inches. Secondary supports 206-212 may be coupled to primary supports 202-204 using one or more 12 gauge metal connectors welded to a secondary support in conjunction with one or more other fasteners passing through the 12 gauge metal connectors.

In one or more embodiments, a secondary support may be made of two or more separate components coupled together. The two or more separate components may be coupled together using one or more fasteners, adhesive, welding, or any other process capable of joining the two or more separate components to form a secondary support. In one or more embodiments, one or more of secondary supports 206-212 is composed of two or more separate 12 gauge cold rolled steel channels coupled using 12 gauge end plates welded to the channels and secured with one or more fasteners passing through the 12 gauge end plates.

Although four secondary supports 206-212 are shown, one of ordinary skill in the art will recognize that any number of secondary supports may be used without departing from the spirit or the scope of the embodiments described herein.

Figure 4:
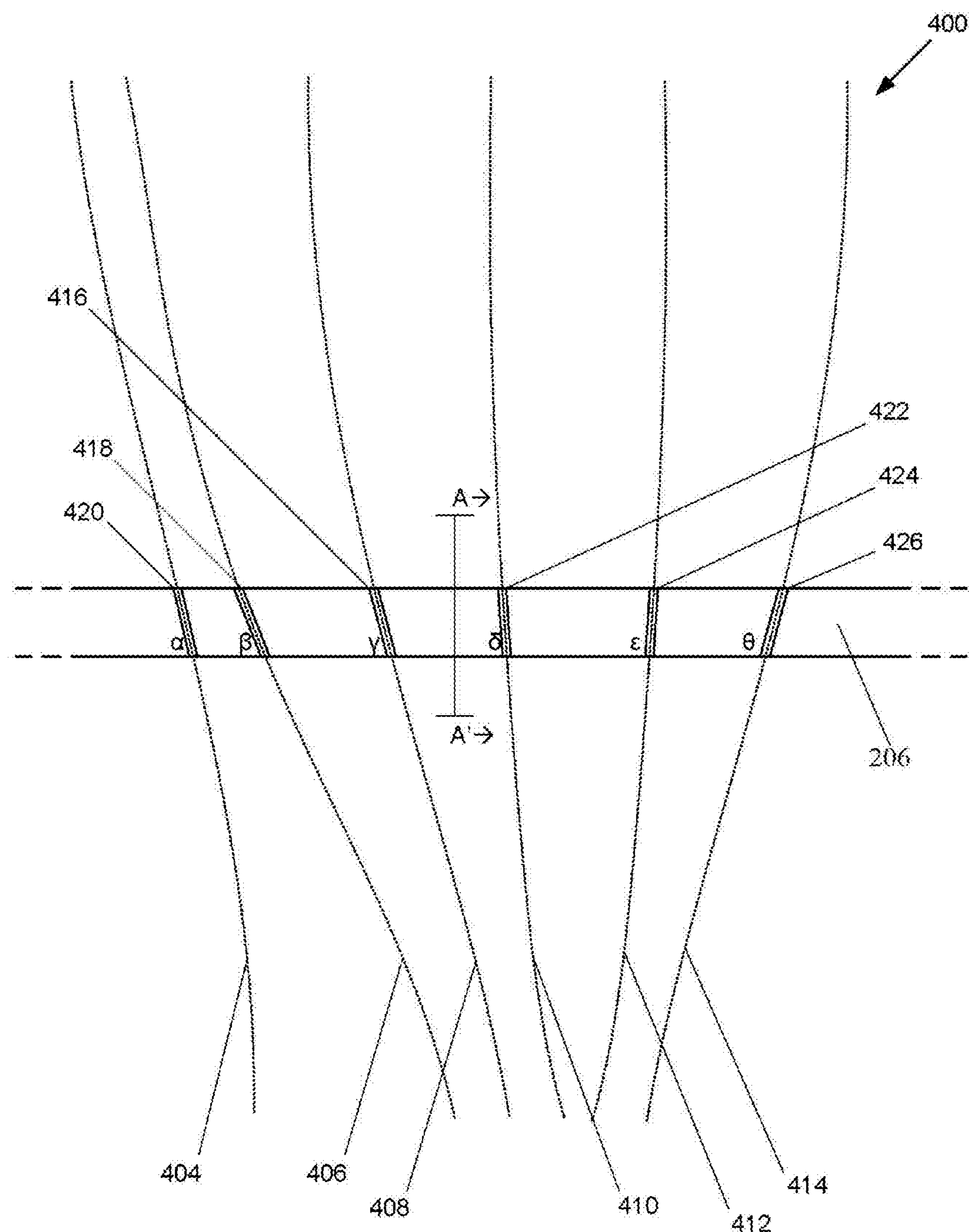
FIG. 4 illustrates an exemplary secondary support in accordance with one or more embodiments of systems and methods for a supported architectural design.

Secondary supports 206-212 have a plurality of fin slots configured to couple with a plurality of flexible fins 214, as described more fully at FIG. 4.

Supported architectural design system 200 further includes a plurality of flexible fins 214. Flexible fins 214 are constructed out of any flexible material, such as steel, aluminum, any other metal, plastic, or any other flexible material capable of flexing to fit through the fin slots of secondary supports 206-212. In one or more embodiments, flexible fins 214 are be constructed from 22 gauge cold rolled steel. Flexible fins 214 may be veneered steel.

One or more embodiments also enable the use of rigid fins. Rigid fins may be constructed out of any material, such as steel, aluminum, any other metal, plastic, or any other suitable material.

In one or more embodiments, flexible fins 214 have an inner edge facing the plurality of secondary supports and an outer edge facing away from the plurality of secondary supports. The inner edge may include a plurality of attachment points configured to couple with secondary supports 206-212. The flexible fins 214 are configured to couple with secondary supports 206-212. The attachment points of flexible fins 214 may be configured to couple with the fin slots of secondary supports 206-212. In one or more embodiments, the flexible fins 214 are configured to protrude from secondary supports 206-212 when coupled with secondary supports 206-212. In one or more embodiments, a position of one or more attachment points of flexible fins 214 is customized based on a fin configuration design. Attachment points may be laser-cut using a laser-cutting device provided with the desired positions for the plurality of attachment points.

Figure 3:
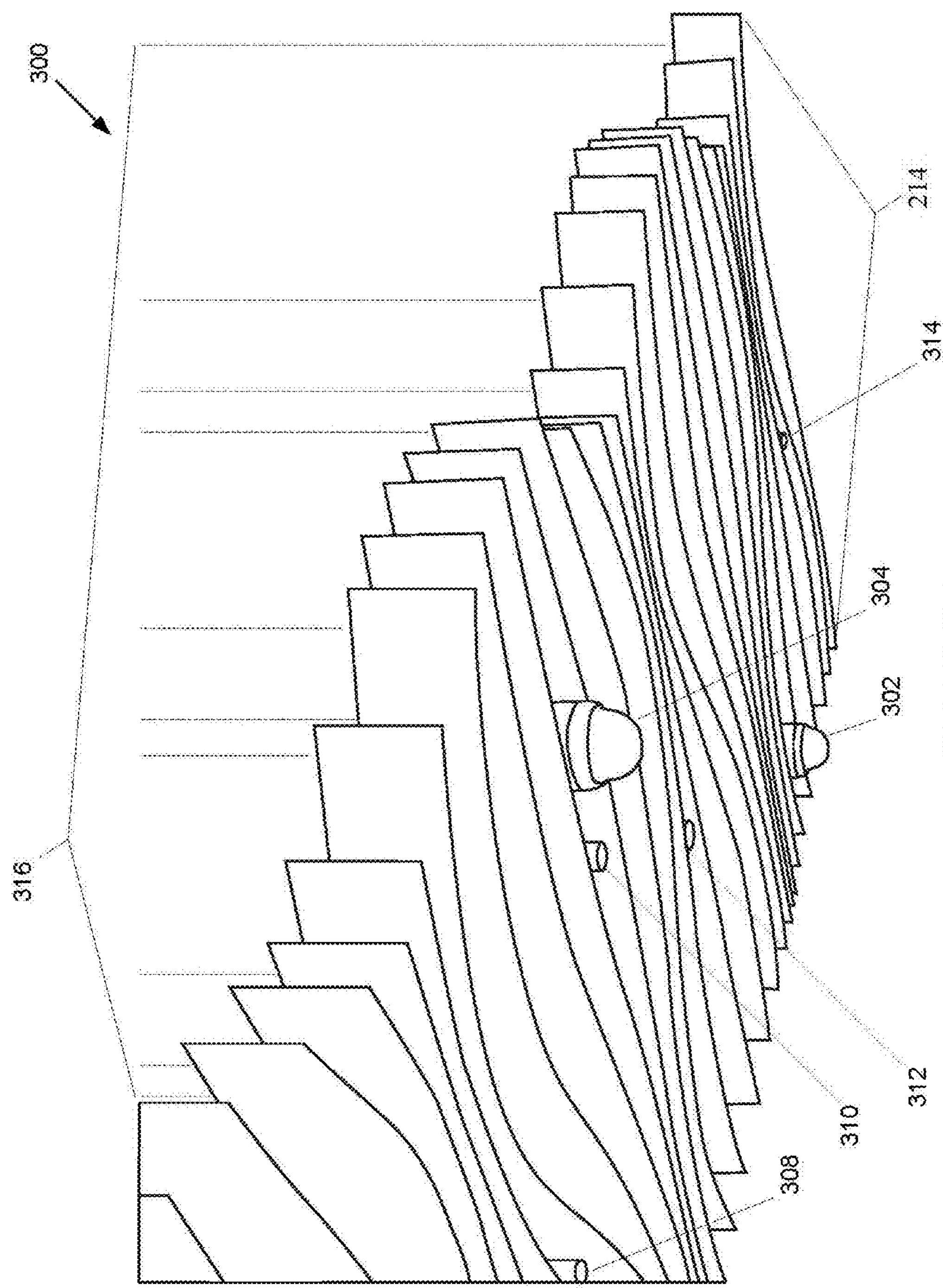
FIG. 3 is a bottom perspective view of an exemplary supported architectural design system in accordance with one or more embodiments of systems and methods for a supported architectural design.

FIG. 3 is a bottom perspective view of an exemplary supported architectural design system in accordance with one or more embodiments of systems and methods for a supported architectural design. Supported architectural design system 300 is coupled with one or more architectural structures by supports 316. Supports 316 include one or more fasteners and/or structural components capable of supporting supported architectural design system 300, including but not limited to one or more cables, struts, beams, couplers, plates, joints, pipes, rails, or any other structural components capable of partially or fully supporting supported architectural design system 300. In one or more embodiments, supports 316 couple supported architectural design system 300 with one or more ceiling systems.

Supported architectural design system 300 may include one or more additional elements 302-312. Additional elements 302-312 may include lights, security cameras, decorative elements, or any other additional elements compatible with systems and methods for a supported architectural design. Additional elements 302-312 may be coupled with primary supports and/or or secondary supports of supported architectural design system 300. In one or more embodiments, additional elements 302-312 include at least one hanging element partially or fully extending beyond the outer edges of flexible fins 214 of supported architectural design system 300.

In one or more embodiments, the primary supports of supported architectural design system 300 include one or more strut channels compatible with one or more standardized structural systems. In one or more embodiments, additional elements 302-312 may be coupled with one or more additional structural components that are compatible with the standardized structural system. The additional structural components may include a lighting system 308, 310, 312, and 314, security system 302 and 304, a support system 316, or any other system compatible with the standardized structural system.

In one or more embodiments, the primary supports of supported architectural design system 300 are P1000 Unistruts and the additional structural components include Unistrut-compatible support components coupled with one or more additional elements 302-312. The P1000 Unistruts and the Unistrut-compatible support components are coupled using one or more fasteners, such as nuts, bolts, screws, clamps, pins, clips, sheet metal, hinges, rivets, lugs, caps, washers, nails, anchor, or any other fastener. In one or more embodiments, the fasteners include one or more Unistrut "U" shape fittings.

FIG. 4 illustrates an exemplary secondary support in accordance with one or more embodiments of systems and methods for a supported architectural design. Partial system 400 includes secondary support 206.

Secondary support 206 may be constructed of any suitable material, such as plastic, wood, metal, composite, or any other material suitable for providing structural support. In one or more embodiments, the secondary support 206 is constructed out of a metal, such as steel, aluminum, or any other suitable metal. In one or more embodiments, secondary support 206 is a cold rolled steel channel. Although any gauge of metal may be used to form a channel of any size, one or more embodiments of secondary support 206 is a 12 gauge cold rolled steel channel with a length and width of 1.5 inches.

Secondary support 206 has a plurality of fin slots 416-426 configured to couple with a plurality of flexible fins. Fin slots 416-426 are partial cuts made through the width of secondary support 206. In one or more embodiments where secondary support 206 is a channel, fin slots 416-426 may be any partial cut through the channel, such as a partial cut through a bottom wall of the channel, a complete cut through a bottom wall of the channel, a cut through the bottom wall of the channel and at least one side wall of the channel, or any other partial cut in secondary support 206. In one or more embodiments, the width of fin slots 416-426 is greater than a width of a flexible fin.

In one or more embodiments, fin slots 416-426 are custom cuts that are determined using a general-purpose computer with at least one processor configured to execute computer-readable instructions stored on a computer-readable medium. The instructions are configured to cause the at least one processor to perform steps including obtaining a fin configuration design including fin positions 404-414, determining a structurally sound configuration for a plurality of primary supports, and determining a structurally sound configuration for a plurality of secondary supports 206, and calculating a position and shape for a plurality of fin slots 416-426 based on fin positions 404-414. In one or more embodiments, one or more secondary supports 206 are custom-cut based on the calculated positions and shapes for the plurality of fin slots 416-426. Although any method of providing custom-cut fin slots 416-426 may be used, one or more embodiments of secondary support 206 are laser-cut using a laser-cutting device provided with the calculated positions and shapes for the plurality of fin slots 416-426.

Fin slots 416-426 are configured to guide flexible fins of a supported architectural design system along the desired fin positions 404-414. Fin slots 416-426 may be straight cuts in secondary support 206 made at angles α β γ δ ϵ and θ. Angles α β γ δ ϵ and θ may include any angle determined based on fin positions 404-414, including a right angle directly across the width of secondary support 206. In one or more embodiments, fin slots 416-426 may include one or more curved cuts in secondary support 206.

Figure 5:
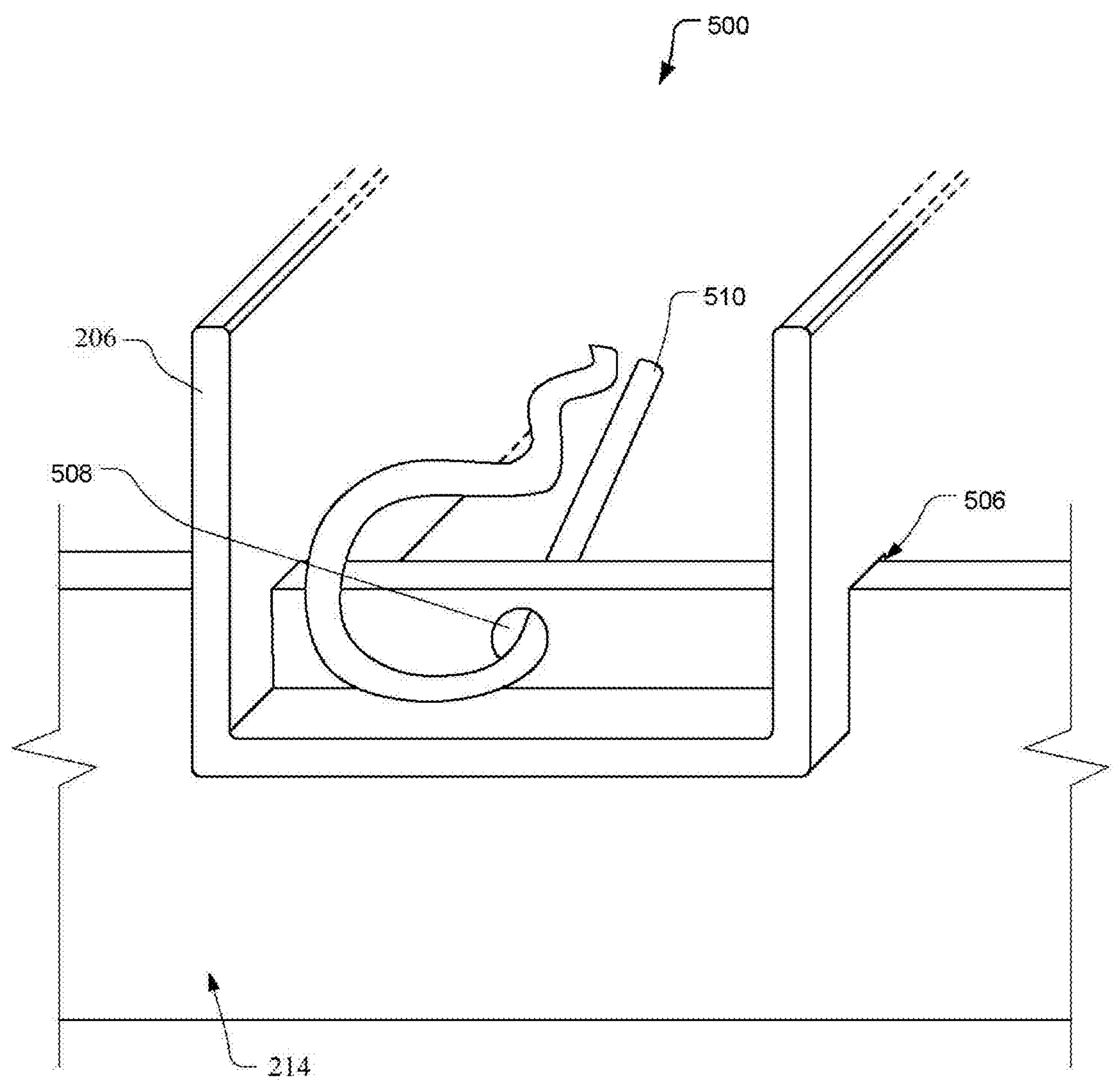
FIG. 5 is a cross sectional view of an exemplary secondary support configuration for coupling with a flexible fin in accordance with one or more embodiments of systems and methods for a supported architectural design.

FIG. 5 is a cross sectional view (A-A' in FIG. 4) of an exemplary secondary support coupled with a flexible fin in accordance with one or more embodiments of systems and methods for a supported architectural design.

Partial system 500 includes secondary support 206. Secondary support 206 is configured to receive flexible fin 214. Flexible fin 214 includes an inner edge with attachment point 508. Attachment point 508 may include one or more features on or near the inner edge of flexible fin 214 usable to couple flexible fin 214 with secondary support 206 at fin slot 506. In one or more embodiments, attachment point 508 does not include feature, and is simply an identified location for applying one or more fasteners 510 to flexible fin 214. The one or more features may include one or more holes, slots, cuts, protrusions, recesses, or any other feature usable to couple flexible fin 214 with secondary support 206 at fin slot 506. The one or more features may be cut, manufactured, molded, glued, taped, welded, or otherwise applied to flexible fin 214 to provide attachment point 508.

In one or more embodiments, secondary support 206 is a channel and fin slot 506 is a cut through a portion of secondary support 206, including the bottom wall and the two side walls such that an entire inner edge of flexible fin 214 may be seated within fin slot 506.

Attachment point 508 may be one or more holes near the inner edge of flexible fin 214. In one or more embodiments, attachment point 508 is configured to receive one or more fasteners 510 to couple flexible fin 214 with secondary support 206 when flexible fin 214 is seated within fin slot 506. In one or more embodiments, fasteners 510 may include one or more nuts, bolts, screws, clamps, pins, clips, sheet metal, hinges, rivets, lugs, caps, washers, nails, anchor, or any other fastener capable of coupling flexible fin 214 with attachment point 508 when flexible fin 214 is seated within fin slot 506.

In one or more embodiments, fasteners 510 may be welded, manufactured, glued, clamped or otherwise affixed to secondary support 206. In one or more embodiments, when flexible fin 214 is seated within fin slot 506, fastener 510 affixed to secondary support 206 are configured to automatically engage at least one attachment point 508 to couple flexible fin 214 with secondary support 206.

Figure 6:
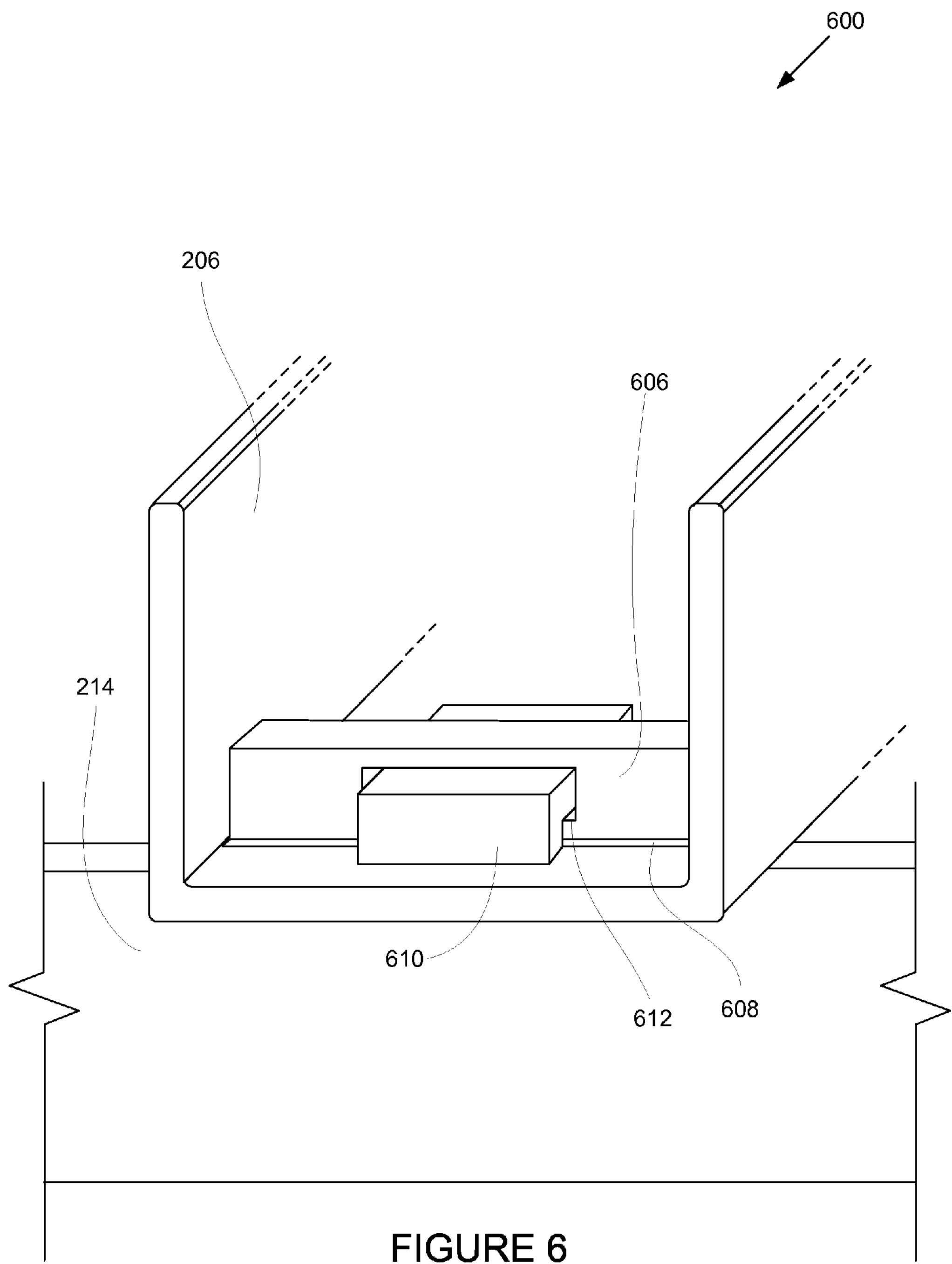
FIG. 6 is a cross sectional view of another exemplary secondary support configuration for coupling with a flexible fin in accordance with one or more embodiments of systems and methods for a supported architectural design.

FIG. 6 is a cross sectional view (A-A' in FIG. 4) of an exemplary secondary support coupled with a flexible fin in accordance with one or more embodiments of systems and methods for a supported architectural design.

Partial system 600 includes secondary support 206. Secondary support 206 is configured to receive flexible fin 214. Flexible fin 214 includes an inner edge with one or more attachment points, including one or more features on or near the inner edge of flexible fin 214 usable to couple flexible fin 214 with secondary support 206 at fin slot 608. The one or more features may include one or more holes, slots, cuts, protrusions, recesses, or any other feature usable to couple flexible fin 214 with secondary support 206 at fin slot 608. The one or more features may be cut, manufactured, molded, glued, taped, welded, or otherwise applied to flexible fin 214 to provide attachment point 606.

In one or more embodiments, secondary support 206 is a channel and fin slot 608 is a cut through a bottom wall of secondary support 206 such that a protruding tab of flexible fin 214 may be seated within fin slot 612.

In one or more embodiments, the attachment point includes protruding tab 606 and slot 612. Protruding tab 606 protrudes from an inner edge of flexible fin 214. Protruding tab 606 is configured to fit within fin slot 608. Fin slot 612 is positioned on protruding tab 606. Fin slot 612 is configured to receive one or more fasteners 610 to couple flexible fin 214 with secondary support 206 when flexible fin 214 is seated within fin slot 612. In one or more embodiments, fasteners 610 may include one or more nuts, bolts, screws, clamps, pins, clips, sheet metal, hinges, rivets, lugs, caps, washers, nails, anchor, or any other fastener capable of coupling flexible fin 214 with fin slot 612 when flexible fin 214 is seated within fin slot 612.

In one or more embodiments, fasteners 610 may be welded, manufactured, glued, inserted, clamped or otherwise affixed to secondary support 206. In one or more embodiments, when protruding tab 606 is inserted into fin slot 608, fastener 610 automatically engages slot 612 to couple flexible fin 214 with secondary support 206.

Figure 7A:
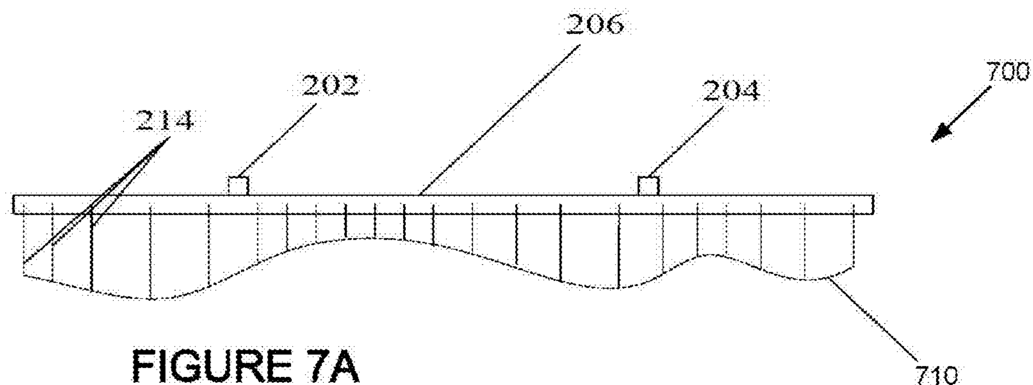
FIGS. 7A-C illustrate exemplary supported architectural design systems in accordance with one or more embodiments of systems and methods for a supported architectural design.
Figure 7B:
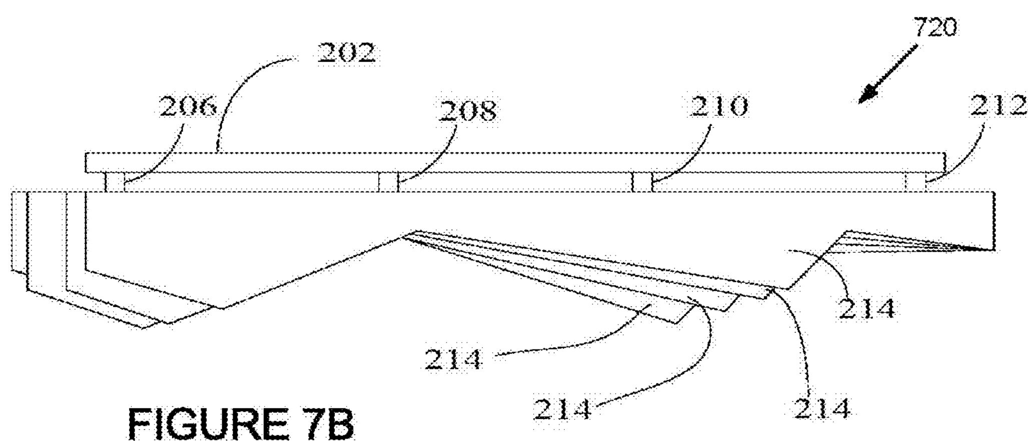
Figure 7C:
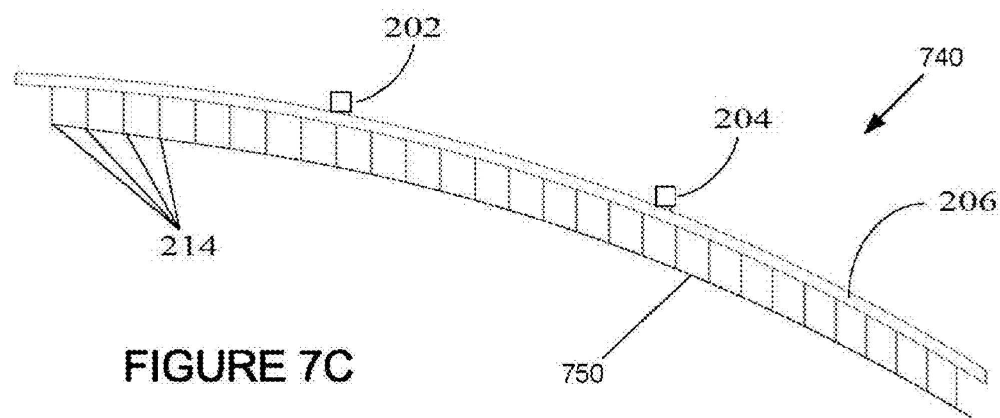

FIGS. 7A-C illustrate exemplary supported architectural design systems in accordance with one or more embodiments of systems and methods for a supported architectural design.

FIG. 7A is a side view of an exemplary supported architectural design system in accordance with one or more embodiments of systems and methods for a supported architectural design. Supported architectural design system 700 includes a plurality of primary supports 202-204 coupled with a plurality of secondary supports 206. A plurality of flexible fins 214 are coupled with a plurality of secondary supports 206. An outer edge of flexible fins 214 conforms to a curved two-dimensional surface 710. In one or more embodiments, curved two-dimensional surface 710 includes any surface in three-dimensional space. As used herein, the term "curved two-dimensional surface" includes any surface in three-dimensional space, including one or more flat surfaces, angled surfaces, rounded or arched surfaces, or any combination thereof. The curve two-dimensional surface may include curved portions, flat portions, angled portions, or any combination thereof.

FIG. 7B is a side view of an exemplary supported architectural design system in accordance with one or more embodiments of systems and methods for a supported architectural design. Supported architectural design system 720 includes a plurality of primary supports 202 coupled with a plurality of secondary supports 206, 208, 210, and 212. A plurality of flexible fins 214 is coupled with secondary supports 206-212 and outer edge of flexible fins 214 conforms to a curved two dimensional surface, such as a curved surface in three-dimensional space. The curve two-dimensional surface may include curved portions, flat portions, angled portions, or any combination thereof.

FIG. 7C is a side view of an exemplary supported architectural design system in accordance with one or more embodiments of systems and methods for a supported architectural design. Supported architectural design system 740 includes a plurality of primary supports 202 and 204 coupled with a plurality of secondary supports 206. A plurality of flexible fins 214 are coupled with secondary supports 206. An outer edge of flexible fins 214 conforms to a curved two-dimensional surface 750. In one or more embodiments, secondary supports 206 have a curvature in the elevation dimension as shown in FIG. 7C.

While the systems and methods for providing a supported architectural design described herein disclosed has been described by means of specific embodiments and applications thereof, numerous modifications and variations could be made thereto by those skilled in the art without departing from the scope of the embodiments described herein set forth in the claims.

What is claimed is:

1. A supported architectural design system comprising:

a plurality of primary supports configured to couple with one or more architectural structures;

a plurality of flexible fins, wherein at least one of said plurality of flexible fins comprises an inner edge and an outer edge, wherein said inner edge comprises at least one tab with an attachment section; and a plurality of secondary supports coupled with said plurality of primary supports, wherein at least one of said plurality of secondary supports is horizontally curved and configured in cross section as a u-shaped channel comprising a bottom wall and two side walls, wherein said bottom wall includes at least one fin slot coupled with said at least one tab at said attachment section, and wherein said at least one fin slot comprises a cut through said bottom wall of said u-shaped channel, wherein said attachment section comprises a hole that receives at least one fastener inside said u-shaped channel to secure said at least one of said plurality of flexible fins to said bottom wall of said u-shaped channel.

2. The supported architectural design system of claim 1, wherein said plurality of primary supports is coplanar.

3. The supported architectural design system of claim 2, wherein said plurality of primary supports are substantially parallel when coupled with said one or more architectural structures and said plurality of secondary supports.

4. The supported architectural design system of claim 1, wherein said plurality of secondary supports is coplanar.

5. The supported architectural design system of claim 4, wherein said plurality of secondary supports is substantially parallel when coupled with said plurality of primary supports.

6. The supported architectural design system of claim 4, wherein said plurality of secondary supports are substantially perpendicular to said plurality of primary supports when coupled with said plurality of primary supports.

7. The supported architectural design system of claim 1, wherein said one or more architectural structures is a ceiling structure.

8. A supported architectural structure comprising:

a plurality of primary supports in a substantially parallel configuration and configured to couple with one or more architectural structures;

a plurality of secondary supports coupled with said plurality of primary supports in a substantially perpendicular configuration, wherein at least one of said plurality of secondary supports is a u-shaped channel comprising a bottom wall and two side walls, said at least one of said plurality of secondary supports including at least one fin slot, wherein said at least one fin slot comprises a cut through said bottom wall of said u-shaped channel;

a plurality of flexible fins, at least one of said plurality of flexible fins having an inner edge and an outer edge, said inner edge comprising at least one tab with an attachment section, wherein said at least one tab is coupled to said at least one fin slot at said attachment section; and at least one coupler removably coupling said at least one of said plurality of flexible fins to said at least one of said plurality of secondary supports at said attachment section inside said u-shaped channel to secure said at least one of said plurality of flexible fins to said bottom wall of said u-shaped channel.

9. The supported architectural design system of claim 8, wherein said plurality of secondary supports is horizontally curved.

10. The supported architectural design system of claim 8, wherein said one or more attachment points is a hole.

11. The supported architectural design system of claim 10, wherein said one or more couplers is a pin configured to securely fit in said hole.

12. A supported architectural structure comprising:

a plurality of primary supports in a substantially parallel configuration and configured to couple with one or more architectural structures;

a plurality of secondary supports coupled with said plurality of primary supports in a substantially perpendicular configuration, wherein at least one of said plurality of secondary supports is a u-shaped channel comprising a bottom wall and two side walls, said at least one of said plurality of secondary supports including at least one fin slot, wherein said at least one fin slot comprises a cut through said bottom wall of said u-shaped channel;

a plurality of flexible fins, at least one of said plurality of flexible fins having an inner edge and an outer edge, said inner edge comprising at least one tab with an attachment section, wherein said at least one tab is coupled to said at least one fin slot at said attachment section; and at least one coupler automatically and removably coupling said at least one of said plurality of flexible fins to said at least one of said plurality of secondary supports through said attachment section, wherein said attachment section is located inside said u-shaped channel to secure said at least one of said plurality of flexible fins to said bottom wall of said u-shaped channel.

13. The supported architectural design system of claim 12, wherein said plurality of secondary supports is horizontally curved.

* * * * *